United States Patent [19]

Hunter

[11] 4,118,069

[45] Oct. 3, 1978

[54] FRAME ARM JOINT STRUCTURE FOR SEAT OR CHAIR STRUCTURE

[76] Inventor: George Taylor Hunter, Rte. 3, Box 250, Howe, Ind. 46764

[21] Appl. No.: 730,384

[22] Filed: Oct. 7, 1976

[51] Int. Cl.² .............................................. A47C 7/54
[52] U.S. Cl. ..................................... 297/416; 297/417
[58] Field of Search ........ 297/113, 115, 117, 160–162, 297/416, 417; 248/407–409; 285/82, 87, 396, 402; 403/319, 349

[56] References Cited

U.S. PATENT DOCUMENTS

| | | | |
|---|---|---|---|
| 1,099,670 | 6/1914 | Shoffner | 403/349 X |
| 2,885,223 | 5/1959 | Duff | 285/402 X |
| 3,423,781 | 1/1969 | Henson | 403/349 X |
| 3,807,799 | 4/1974 | Freedman | 297/417 |
| 3,883,175 | 5/1975 | Rodaway | 297/416 |

Primary Examiner—James C. Mitchell
Attorney, Agent, or Firm—Marmaduke A. Hobbs

[57] ABSTRACT

An arm joint structure for a seat or chair in which a tubular member is attached to the back and is provided with a pin or lug extending into the opening through the member, and a stem connected to an arm frame projects laterally therefrom into the opening in the tubular member. A slot extends inwardly from the free end of the stem and terminates in a transverse arcuate slot for receiving the pin or lug, which permits rotation of the stem in the sleeve to locate the arm either in the horizontal position or in a raised vertical position. The arm may be removed by withdrawing the stem from the opening in the sleeve, and an arm may be assembled on either side, or switched from one side to the other. A spring clip is preferably used to hold the assembled arm in place to prevent accidental removal thereof.

10 Claims, 11 Drawing Figures

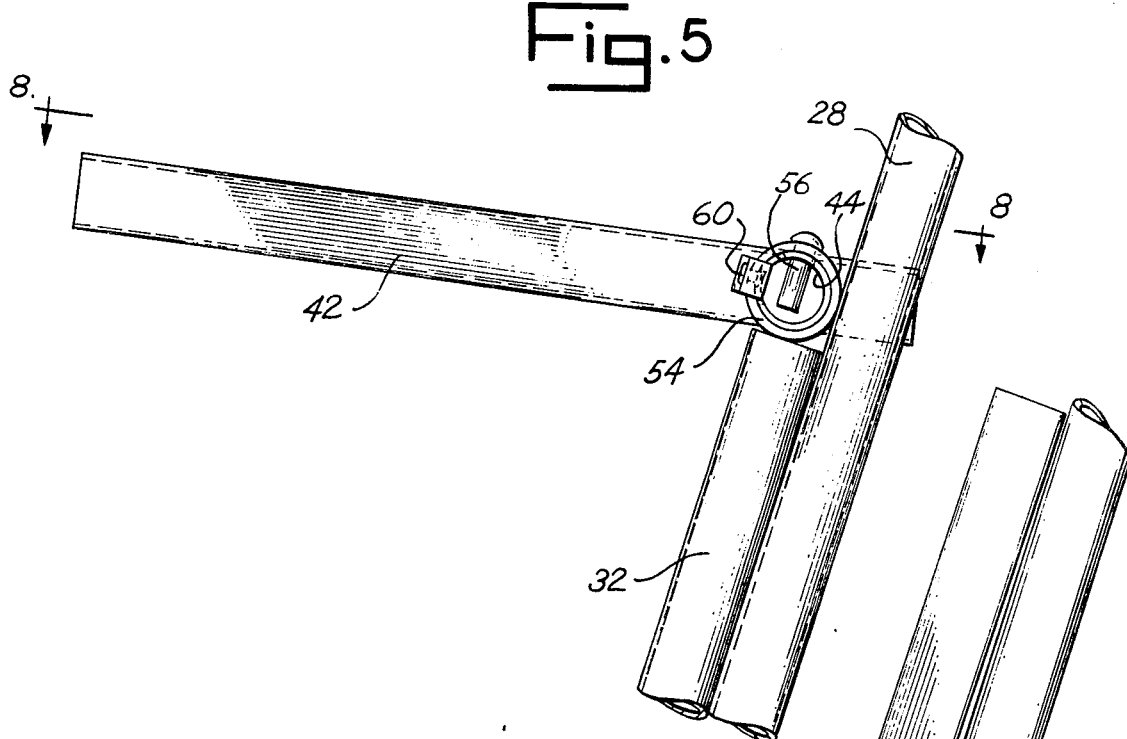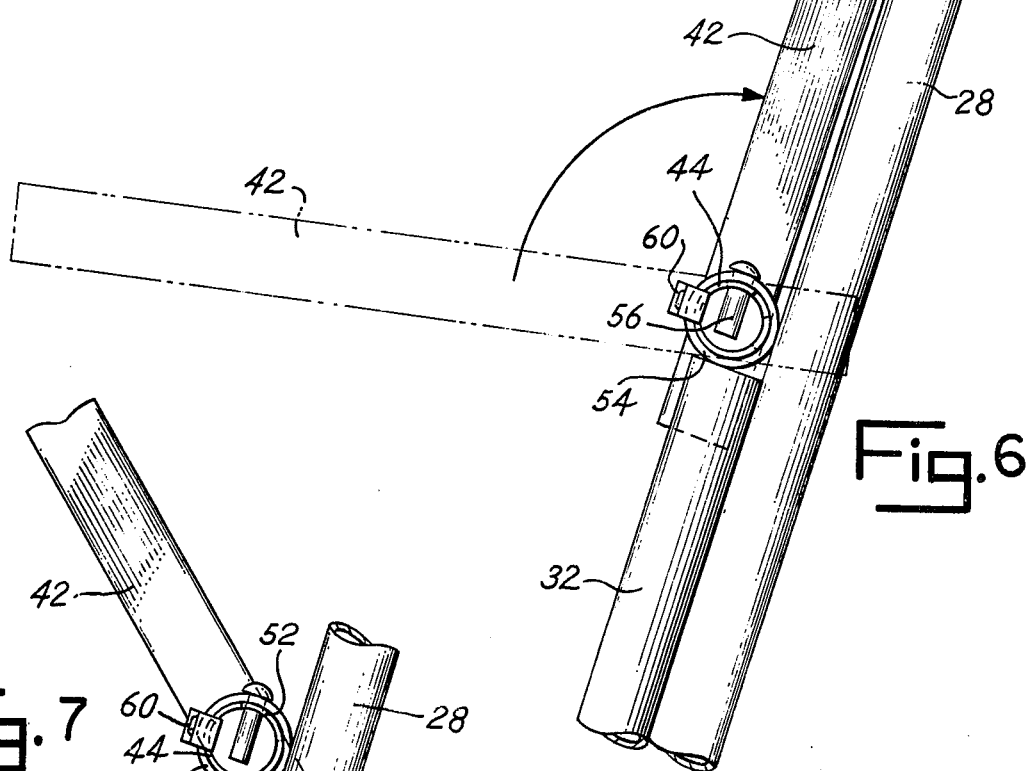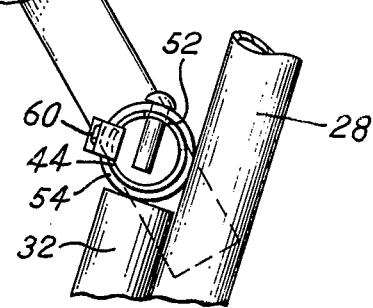

U.S. Patent  Oct. 3, 1978  Sheet 3 of 3  4,118,069
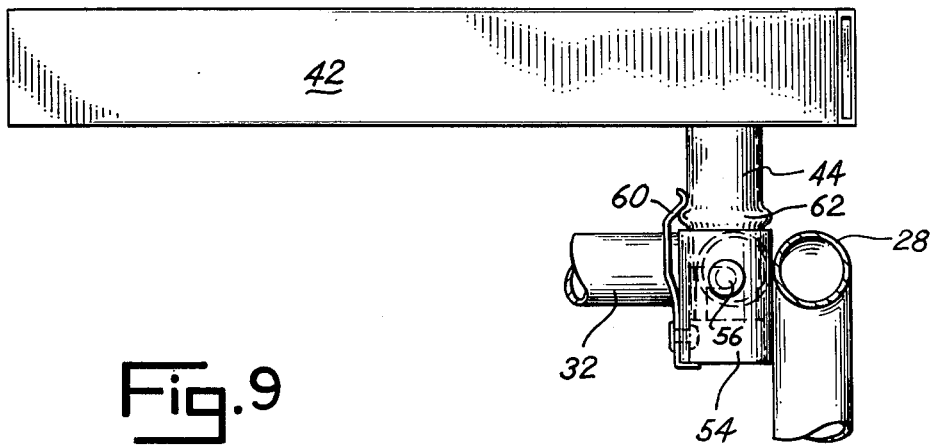
Fig.8
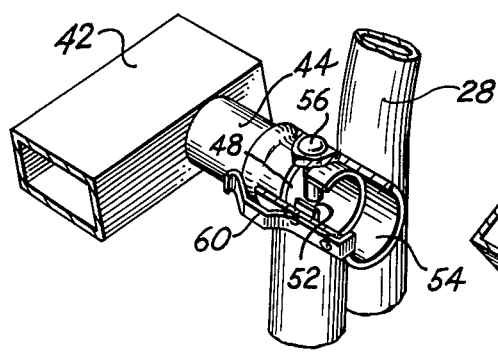
Fig.9
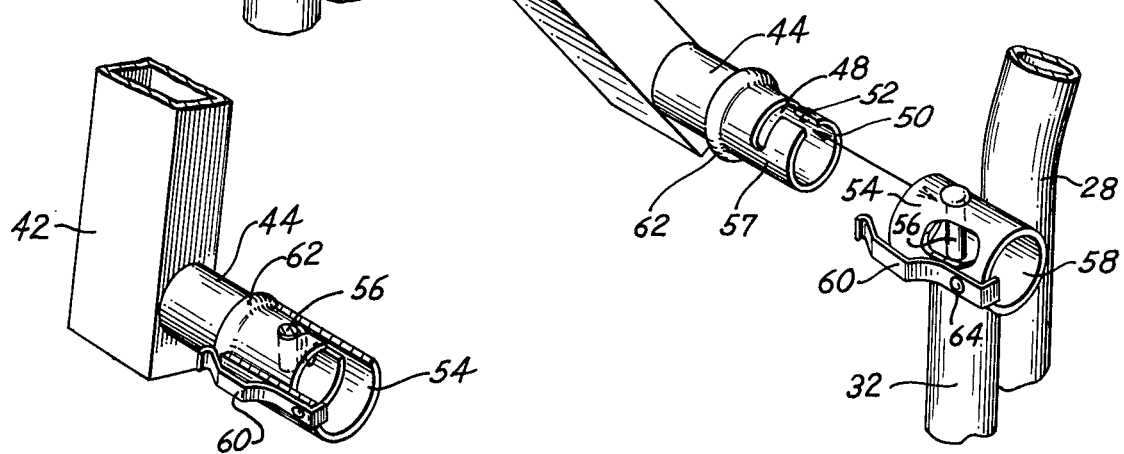
Fig.11
Fig.10

FRAME ARM JOINT STRUCTURE FOR SEAT OR CHAIR STRUCTURE

In the typical or conventional seats used on planes, buses and the like, and chairs for school classes, the arm or arms are often rigidly attached to the frame and, in school chairs, whether or not the arms are rigidly attached to the chairs, they are in most instances permanently attached to the right side of the frame of the chairs. It is often desirable in connection with the aforementioned seats and chairs to be able to remove one or both of the arms and/or to shift an arm from one side of the seat or chair to the other. In addition, it is usually desirable to be able to raise and lower one or both of the arms to permit a person to easily sit down into and arise from a seat or chair. However, the joint between the pivoted arm and chair back or frame is usually unsightly or constitutes a device on which the occupant can easily injure himself. It is therefore one of the principal objects of the present invention to provide a seat or chair frame structure in which one or both arms of the chair can be readily removed and switched from one side to the other, and in which the arms are pivoted to be raised and lowered between an arm rest position and a position where they will not interfere with the occupant of the seat or chair while he is using the seat or chair and while he is sitting down in or getting up from the seat or chair.

Another object of the invention is to provide a seat or chair frame structure in which the arm or arms are easily removable, yet will stay firmly in place to support the occupant's arms, and in which the joint for attaching the arm can effectively be concealed so that the seat or chair will not reveal the fact that the arm is removable.

Still another object of the invention is to provide a joint connecting an arm to the frame or back of a seat or chair, which can be easily attached to the arm and frame or back in a limited space and operated without damaging the upholstery, and which holds the arm rigidly in place, yet permits the arm to pivot upwardly along the side of the back and to be interchanged between the right and left sides of the seat or chair.

A further object is to provide a pivoted and removable arm structure for a seat or chair of the aforesaid type, which is versatile and easily operated and assembled on and removed from the seat or chair, and which can be fabricated and stored for use on either the right or left sides of the seat or chair.

Additional objects and advantages of the present invention will become apparent from the following description and accompanying drawings, wherein.

Figure 2:
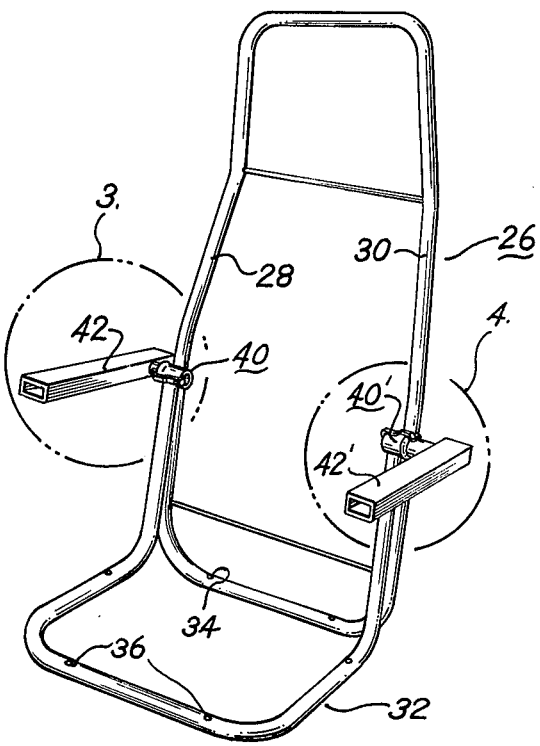
FIG. 2 is a perspective view of the frame of the upper part of the seat, including pivoted and removable arms.
Figure 3:
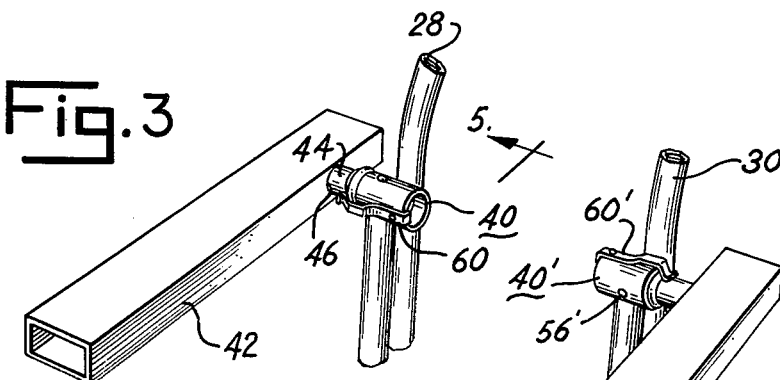
Figure 4:
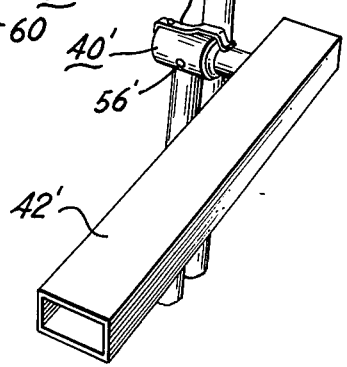

FIGS. 3 and 4 are enlarged perspective views of the arm structure and adjacent frame, showing the arm in position for use by an occupant of the seat by an occupant of the seat, identified by broken circles 3 and 4 in FIG. 2;

FIG. 5 is a fragmentary side elevational view as seen from the position indicated by the lines 5—5 on FIG. 3, showing the arm in position for use by the occupant of the chair;

FIG. 6 is an elevational view of a section of the frame, showing the arm pivoted upwardly to its raised position;

FIG. 7 is a view similar to that shown in FIG. 6, illustrating the arm in position for removing it from the frame;

FIG. 8 is a top plan view of the arm and a fragmentary sectional view of the seat frame, showing the arm in its lowered position for use by the occupant of the chair;

FIG. 9 is a fragmentary view of the seat frame shown in the preceding figures, with a portion of the joint between the arm and the frame broken away and shown in section to better illustrate the construction and operation of the joint;

FIG. 10 is a fragmentary view of the arm similar to that shown in FIG. 9, but illustrating the arm in its raised position instead of its lowered position; and FIG. 11 is a fragmentary perspective view of the arm and frame and a partial sectional view of the joint, showing the manner in which the arm is removed from the frame.

Figure 1:
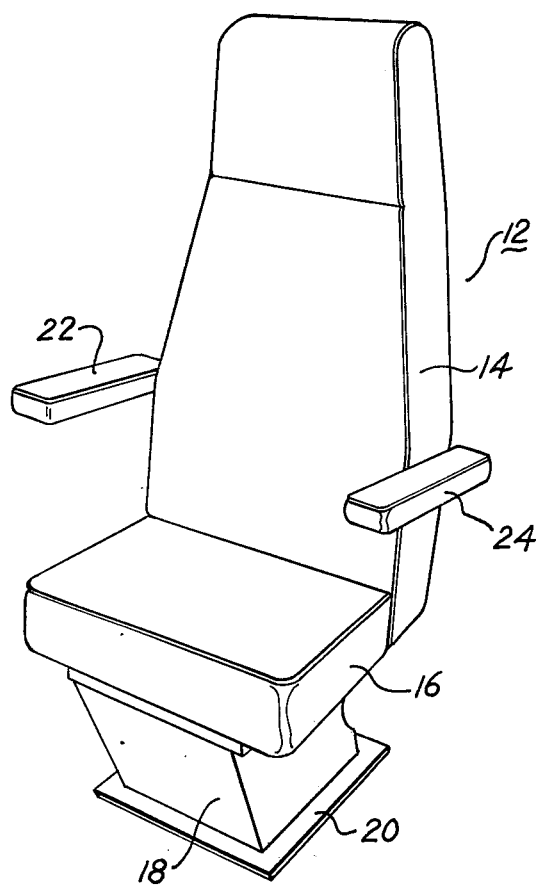
FIG. 1 is a perspective view of an upholstered seat, the type normally used in a plane, showing pivoted and removable arms of the present invention in place on the seat for use by the occupant.

Referring more specifically to the drawings, and to FIG. 1 in particular, numeral 12 indicates generally a seat, such as that used on a plane, having a back 14, seat portion 16, pedestal 18 and a base 20 for attaching the seat rigidly to the floor structure. Attached to back 14 are pivoted and removable arms 22 and 24 shown in the position for supporting the arms of the occupant of the seat. The principal part of the invention involves the structure in which the arm is pivotally and removably connected to the chair back or frame. Hence, the remaining structure of the seat or chair may be any number of different types, including those used in planes, buses, trains, theaters, and in chairs used in school classes and the like. While the frame shown is a commonly used frame for seats and chairs, other types of frames may be used on which my structure is mounted.

In the structure illustrated, the seat has a tubular frame 26 with vertical side members 28 and 30 supported in part by a tubular member 32 connected at the sides of the two vertical members 28 and 30 by welding or riveting. The frame is attached rigidly to legs or a pedestal, such as illustrated in FIG. 1, by bolts or screws extending downwardly through holes 34 in frame 26 and holes 36 in member 32.

The joint between the arms and the frame of the seat is indicated generally by numeral 40 on the right hand side and numeral 40' on the left hand side. The joints are essentially the same, with minor modification, and consequently, a full description of only the right hand joint will be given herein, and like numerals with primes will be used in describing the left joint where applicable. Arms 22 and 24 of the seat shown in FIG. 1 are upholstered, and each contains an inner rigid body 42, and 42'; respectively, preferably of rectangular tubular metal such as aluminum; however, other types of materials may be used satisfactorily. Member 42 is connected to the joint by a tubular stem 44 joined rigidly at numeral 46 to the member by welding or by any other suitable connecting structure, such as by extending the stem inwardly into a hole in member 42 and securing the stem therein with rivets. The construction of the stem is best seen in FIG. 11 wherein the joint is shown disassembled when the arm is either being removed or assembled on the seat or chair.

The stem 44 is provided with a slot 48 extending partially around the circumference of the stem and spaced inwardly from end 50. Slot 48 is connected to end 50 by a slot or groove 52 at a point approximately midway between the ends of slot 48. While the stem is shown as a tubular member, it could be constructed of a solid piece of material, and slots 48 and 52 cut therein. The stem slips into a sleeve 54, which contains a pin or lug 56 extending inwardly into the hollow interior of the sleeve, and mates with the slots. The sleeve is rigidly secured to vertical side members 28 and 30 and supports the arm when the joint has been assembled in operating position. The diameter of the stem is only slightly smaller than the internal diameter of the sleeve, and hence the stem slips freely into opening 58 in the sleeve when the arm is assembled on the chair.

In assembling the joint, portion 57 of stem 44 is inserted in the opening 58 of sleeve 54 in the manner illustrated by the arrow in FIG. 11, slot 52 passing along pin 56 until the pin is seated in arcuate slot 48. Since pin 56 is rigidly secured in the side wall of sleeve 54, it locates the position of the stem of the arm in both the horizontal and vertical positions by the ends of the arcuate slot contacting the pin, which forms a stop to prevent further rotation of stem 44 in sleeve 54. Further, when the pin is seated in either end of the slot, i.e. away from the center where slot 52 connects with slot 48, the pin prevents stem 44 from being removed from sleeve 54, since the stem can only be removed from the sleeve when the sleeve has been rotated to an angular position where slot 52 will pass along pin 56. While the pin and slot prevent the arm from being removed when it is either in its lowered or fully upward position, the arm can be removed when it is in the angular position shown in FIG. 11. In order to prevent unintentional removal of the arm by removing stem 44 from sleeve 54, a spring clip 60 secured to sleeve 54 snaps over an annular rib 62 formed on or in stem 44 in the manner illustrated in FIGS. 3 through 10. Since the spring is readily yieldable, the arm can be removed by applying an outward force thereon near the joint, thus permitting rib 62 to snap from beneath spring clip 60, the spring clip being secured to sleeve 54 by a rivet 64.

In order to permit the arms to be right or left, and/or to be interchangeable between the right and left positions on the seat or chair, pin 56, instead of being in the position shown in FIG. 11, is located in the position shown at 56' in FIG. 4, the change of position of the rivet between the two sides being the only change required to produce a right or left joint for the arm. All of the other features and parts operate in the same manner, regardless of on which side the arm is mounted. However, in switching the arm from the right to the left position, for example, the arm is inverted, thus orienting slot 52 with respect to sleeve 54, thereby requiring a different position of the pin in order to have an arm which is held in horizontal position and capable of pivoting from the horizontal position to a vertical position along the side of the back in the same manner as the right arm. While in the preferred embodiment, the slots are in the stem and the pin or lug is in sleeve 54, these elements may be reversed, locating the slots in the sleeve and the pin or lug in the stem.

In the operation of the chair or seat frame structure and the arm and joint used thereon, the right arm, for example, is assembled on the frame by inserting portion 57 of stem 44 into opening 58 of sleeve 54 with the slot 52 passing along pin 56 until the pin is seated in arcuate slot 48. When the pin is in the latter slot, spring clip 60 fully extends over rib 62, thus holding the arm in place and preventing accidental removal whenever the position of slot 52 and rivet 56 coincide. With the arm assembled in the foregoing manner, the arm will pivot to horizontal position with the rivet in the upper portion of the arcuate slot seated against the curved end thereof, thus holding the arm in a horizontal position. When the arm is to be lifted, it can be pivoted freely upwardly, causing the slot to move along pin 56 into the lower end of slot 48, i.e. the portion thereof best seen in FIG. 11. When the arm is to be removed, it is moved to an angular position where the slot 52 and pin 56 coincide, and then pressed outwardly by applying pressure to the arm near stem 44 to cause spring clip 60 to release rib 62, thereby permitting the stem to slip outwardly from sleeve 54. The operation of the arm on the left side of the seat or chair is performed in the same manner.

When the chair is upholstered, the joint is virtually enclosed and concealed, and the parts thereof do not interfere with the occupant of the chair, or cause any hazard which might injure the occupant or his clothes. Yet the arm can be raised, lowered, and removed and assembled with little difficulty, and the seat or chair can be used without either of the arms or with only one of the arms. When the present concept is used for a school classroom chair, only one arm is normally used and that arm contains an arm rest. The arm and arm rest can, however, be raised and lowered and interchanged between the right and left positions, provided the arm rest is so constructed that it can be used satisfactorily on either of the flat sides.

While only one embodiment of the present chair or seat frame structure has been described in detail herein, various changes and modifications may be made without departing from the scope of the invention.

I claim:

1. An arm joint structure for a seat or chair having a back, comprising an arm member, a laterally extending stem connected at one end to said member and projecting substantially at right angles therefrom, means defining an opening receiving said stem for connection to the seat or chair back, means in said stem defining a transverse slot extending approximately one fourth of the periphery of the stem and a longitudinal slot connecting said transverse slot to the other end of said stem, a pin attached to said means defining the opening and extending into said opening, said slots receiving said pin when said stem is inserted in said opening and cooperating therewith for locating said arm member in substantially horizontal and vertical positions.

2. An arm joint structure for a seat or chair as defined in claim 1 in which said stem is cylindrical shaped and said first mentioned transverse slot is arcuate shaped.

3. An arm joint structure for a seat or chair as defined in claim 1 in which said means defining an opening is of a tubular construction and said opening therein is round.

4. An arm joint structure for a seat or chair as defined in claim 2 in which said means defining an opening is of a tubular construction and said opening therein is round.

5. An arm joint structure for a seat or chair as defined in claim 1 in which said stem is cylindrical shaped and said opening in said first mentioned means is round.

6. An arm joint structure for a seat or chair as defined in claim 1 in which means is provided for latching said stem and means defining an opening together when the stem has been inserted in the opening.

7. An arm joint structure for a seat or chair as defined in claim 6 in which said means for latching said stem and means defining the opening together includes a peripherally disposed means on the stem and a spring secured to said means defining the opening for seating on said peripheral means.

8. An arm joint structure for a seat or chair as defined in claim 5 in which means is provided for latching said stem and means defining the opening together, including a peripherally disposed means on the stem and a spring secured to said means defining the opening for seating on said peripheral means.

9. An arm joint structure for a seat or chair having a back, comprising an arm member, a laterally extending stem means connected at one end to said member and projecting substantially at right angles therefrom, a stem support means defining an opening receiving said stem for connection to the seat or chair back, one of said means having a transverse slot extending approximately one fourth of the periphery of said one means and a longitudinal slot connecting said transverse slot to the end of one of said means facing the other of said means, and the other of said means having a lug attached thereto for mating with said slots, said slots receiving said lug and cooperating therewith for locating said arm in substantially horizontal and vertical positions.

10. An arm joint structure for a seat or chair as defined in claim 9 in which said stem and opening are cylindrical shaped and said transverse slot is arcuate shaped.

* * * * *